(12) United States Patent
Pathak et al.

(10) Patent No.: US 6,360,599 B1
(45) Date of Patent: Mar. 26, 2002

(54) DEVICE FOR MEASURING LIQUID LEVEL PREFERABLY MEASURING TIDE LEVEL IN SEA

(75) Inventors: Ardhendu Gajanan Pathak; Gidugu Ananda Ramadass, both of Chennai (IN)

(73) Assignee: National Institute of Ocean Technology Department of Ocean Development Govenment of India, Chennai (IN)

( * ) Notice: Subject to any disclaimer, the term of this patent is extended or adjusted under 35 U.S.C. 154(b) by 0 days.

(21) Appl. No.: 09/382,599

(22) Filed: Aug. 25, 1999

(51) Int. Cl.⁷ ................................................ G01F 23/00
(52) U.S. Cl. .................................... 73/290 V; 181/124
(58) Field of Search .......................... 73/290 R, 290 V, 73/290 B, 73.1, 630; 367/99, 105; 181/123, 124, 125

(56) References Cited

U.S. PATENT DOCUMENTS

| | | | | |
|---|---|---|---|---|
| 4,170,765 A | * | 10/1979 | Austin et al. ................ | 367/100 |
| 4,748,846 A | * | 6/1988 | Haynes ...................... | 73/290 V |
| 4,815,323 A | * | 3/1989 | Ellinger et al. ........... | 73/290 V |
| 4,933,915 A | * | 6/1990 | Bostrom ...................... | 367/99 |
| 4,984,449 A | * | 1/1991 | Caldwell et al. ............. | 73/49.2 |
| 5,095,748 A | * | 3/1992 | Gregory et al. ........... | 73/290 V |
| 5,357,801 A | * | 10/1994 | Sinclair .................... | 73/290 V |
| 5,760,309 A | * | 6/1998 | Maltby et al. ................ | 73/646 |
| 5,764,782 A | * | 6/1998 | Hayes ........................ | 381/160 |
| 5,979,233 A | * | 11/1999 | Johnson ....................... | 73/149 |

* cited by examiner

*Primary Examiner*—Hezron Williams
*Assistant Examiner*—Charles D. Garber
(74) *Attorney, Agent, or Firm*—Dickinson Wright PLLC

(57) ABSTRACT

A device and process for measuring tide levels comprising a guide tube having its lower open end immersed below the lowest tide level, a transducer positioned substantially at the upper end of the guide tube for generation and reception of electrical and acoustical signals, a switching circuit for isolating the transmitting and receiving signals, and at least one branch tube provided near the upper portion of the guide tube. The length of the branch tube is determined by a formula that takes into account the wavelength and velocity of the sound signals, and the diameter of the guide tube is determined by a formula that takes into account the wavelength of the sound signals.

4 Claims, 8 Drawing Sheets

FIG.3 Variation of Amplitude transmission co-efficient of a resonating side branch of length corresponding to n = 4, f = 7.6 kHz in Equation (2)

FIG. 4  Received signal at the transducer for a sounding tube with a hole as calibrator FIG.5 Received signal at the transducer for a sounding tube with side branch resonator as calibrator for f = 7.6 kHz FIG. 6  Received signal at the transducer for a sounding tube with side branch resonator as calibrator for f = 6.4 kHz

DEVICE FOR MEASURING LIQUID LEVEL PREFERABLY MEASURING TIDE LEVEL IN SEA

FIELD OF THE INVENTION

The present invention relates to a device for measuring liquid level preferably measuring tide level in sea.

The subject invention relates to an acoustic tide gauge with provisions of in-situ calibration.

The object of the invention is to achieve greater accuracy, reliability, communication flexibility and to obviate the basic problem of variation in sound waves due to temperature fluctuations.

The other object of the invention is to measure the water level in the presence of tides and other waves.

The acoustic tide gauge is used for high accuracy and reliable measurements of tide levels and operates on the principle of acoustic echo ranging.

BACKGROUND OF THE INVENTION

The invention relates to a measuring device for measuring the tide or liquid level preferably measuring water level by using a sound wave, where the axial temperature and humidity varies in large ranges.

The most typically used levelmeter is the float levelmeter. The major problems associated with these levelmeters are that they can be operated only in a downward or upward direction and they require a vertical structure for mounting their own levelmeter. These types of levelmeters are not useful if the water level of the reservoir is changed by several times.

Conventionally, in the acoustic tide gauge, a sounding tube is used to guide the sound pulse towards the water surface. One open end of the tube is vertically immersed in water, while the other top end is provided with an acoustic transducer for the generation and reception of the sound pulses. However, the accuracy of the measurement depends on the velocity of sound, which varies with temperature fluctuations measured by the formula:

$$C = C_0 \cdot \sqrt{1+(T/273)}$$

where

C is the speed of sound in air in meters per second;

$C_0$ is the speed of sound in air at 0° C. and

T is the temperature in degrees centigrade.

Since one end of the sounding tube is in water and the other end in the air, it has been found not enough to measure the temperature of the air at one point for obtaining the sound velocity and thus the distance. To avoid this, in-situ calibration for each measurement has become necessary.

Conventionally, calibration is done by placing temperature sensors along the length of the tube, to obtain the temperature at select points along the tube.

In this technique, ensuring reliable operation of the sensors under marine conditions is very difficult and moreover the maintenance of the same is equally difficult. Since the sensors are not easily accessible, the data acquisition and signal processing measures are complicated by reason of the increased number of data channels.

The use of ultrasonic liquid level gauging sensors are also known conventionally. Ultrasonic liquid level sensors utilize the fact that ultrasonic vibrations travel freely in a liquid but are rapidly attenuated in air or other gas. If an ultrasonic transducer is mounted on the base of a liquid reservoir so that it directs energy up towards the liquid-air interface, the energy will be reflected back down to the transducer by this interface. By measuring the time taken between the transmission and reception of an energy pulse, it is possible to measure the distance between the transducer and the liquid/air interface and from this, the depth of the liquid.

It is also a common practice for ultrasonic transducers of this kind to be mounted at the lower end of a tube that extends from the bottom to the top of the liquid reservoir. The tube is open at the bottom so that liquid fills the tube to the same depth as in the reservoir outside the tube. The tube serves several purposes: It helps isolate the transducer from other sensors or sources of interference. It also confines the ultrasonic beam, so that it is directed only at the region of the liquid surface directly above the transducer. Furthermore, the tube produces within it a region of liquid surface that is substantially damped of waves.

However, there are various problems associated with these ultrasonic liquid gauging sensors, such as that the amplitude of energy reflected back to the sensor varies considerably with changes in the angle of the liquid surface relative to the axis of the probe, such as caused by a change in attitude of the probe. At angles exceeding about 20 degrees from vertical, the signal return from the liquid surface can be below the lowest signal to noise ratio that is acceptable for reliable measurement of the liquid height. In U.S. Pat. No. 5,357,801, sensors including at least one rod extending within the tube along its length have been provided to increase the range of operational tilt angles over which the sensors can be used, wherein a plurality of calibration reflectors are supported on the rod.

To detect the level of the liquid, the use of a microwave level gauge is also known conventionally as explained in U.S. Pat. No. 5,847,567. The major problem associated with these microwave level gauges is that the changes in temperature results in the expansion or contraction of the length of the waveguide, which results in causing errors in the distance measurement.

U.S. Pat. No. 5,119,676 teaches an apparatus for acoustically measuring the liquid level in a closed vessel comprising an acoustic waveguide attached at a predetermined location to a wall of the vessel, a transducer connected to the acoustic waveguide, a tube having apertures inside the vessel, the tube further including a conical section at one end axially aligned with the acoustic waveguide.

The lower end of the guide tube is provided having the provisions of attachment at several points to provide a water gap around most of its circumference, wherein there is a possibility of the loss of sound velocity from the junction points.

Another calibration technique that is used conventionally consists of providing a hole on the side wall of the sounding tube at a known distance from the transducer, which acts like a partial reflector. A small part of the sound pulse is reflected back towards the transducer by the hole. The drawback associated with this technique is that the hole cannot be provided too far away from the transducer, otherwise it may get submerged at high tide. Besides, the reflected pulses at the hole and the water level get mixed up, if both are too close together. In this process, the other disadvantage is that a part of the signal energy is lost to the surroundings through the hole and also due to the partial reflection at the hole, which leads to reduced signal to noise ratio and hence reduced accuracy.

To overcome the above referenced problems and to attain accuracy in judging tide levels, an apparatus of the subject application has been invented, having provisions for in-situ calibration.

SUMMARY OF THE INVENTION

The measuring device, an acoustic tide gauge of the subject invention, comprises a sounding tube having an open end immersed in water and an acoustic transducer on the other end for generation and reception of sound pulses. The sounding tube is provided with at least one branch tube laterally fixed to the side wall of the sounding tube having a particular length and closed end.

The length of the branch tube "L" in meters equals to $$L=(2n-1)\lambda/4=(2n-1)\ C/4f$$

where n=1,2,3 ... $\lambda$ is the wavelength of sound (meters)

C is the velocity of sound (meters per second) and f is the frequency of sound in Hz; and the diameter of the guide tube is determined by the formula $$d<0.586\ \lambda$$

The side branches are designed to respond to a specific frequency such that the sound pulse with appropriate center frequency is predominantly reflected by the branch. Thus, estimating the effective velocity of sound for different portions of the tube.

Hence, by using properly tuned resonating side branches and signals of different frequencies for calibration and for measurement of the tidal level, the limitations existing in in-situ calibration are overcome.

The length of the side branch, which plays an important part in the subject invention, is an odd multiple of the quarter wave length for a given frequency of sound. At a sound velocity of 340 m/s, for calibration pulse of 7.6 kHz, the wavelength of sound is 4.47 cm and the quarter wavelength is 1.12 cm. Length of the side for the maximum reflection can be an odd multiple of 1.12 cm. Preferably, the length is fixed as 7.85 cm, which is 7 times that of the quarterwave length.

The acoustic tide gauge of the subject invention comprises an electronic circuit for generation, processing and displaying of the data, a sensor head consisting of a suitable transducer to convert electrical energy to acoustical energy and vice versa, and a mechanical system comprising a guide tube, means for calibration, stilling well and fixtures to erect the system at the site.

Accordingly, the subject invention relates to a device for measuring liquid level preferably measuring tide level in the sea, comprising:

a guide tube having its lower open end immersed at least 0.5 m below the lowest liquid or water level to minimize the undesirable-effects of the current and surface waves, means for generating, processing and displaying the data signals, a transducer or a pair of transducers fixed at the upper end of the guide tube for generation and reception of electrical as well as acoustical pulses, a switching circuit for isolating the transmitting and receiving signals, characterized in that at least one branch tube is provided near the upper end of the guide tube having its length determined by the formula $$L=(2n-1)\lambda/4=(2n-1)\ C/4f$$

where n=1,2,3 ... $\lambda$ is the wavelength of sound (meters)

C is the velocity of sound (meters per second), f is the frequency of sound in Hz; and, the diameter of the guide tube is determined by the formula $$d<\alpha_{10}\lambda$$

or $$d<0.586\lambda$$

(where $\alpha_{10}$=0.586)

where $\lambda$ is the wavelength of sound used, d is the diameter of the tube used for guiding acoustic pulse from the transducer towards the water surface and back.

The switching circuit in the subject device isolates the transmitting and receiving signals by suitably biased diodes.

The stilling well in the subject device minimizes the effect of current and waves inside the guide tube.

In an another embodiment of the subject invention, it comprises a process for acoustically measuring liquid level preferably measuring tide waves in sea comprising;

immersing the lower open end of the guide tube at least 0.5 m below the lowest water level, to minimize the undesirable effects of the currents and surface waves;

generating the electrical signals of suitable pulse width and frequency by a digital to analog converter and supplying the amplified signals to the transducer amplified by a power amplifier, converting said electrical signal to the acoustical signal and vice versa by at least two separate units one each for electrical energy to acoustical energy conversion and acoustical energy to electrical energy conversion; and propagating the acoustic pulses in the air through the inside of the said guiding tube by transducer;

measuring the effective velocity of the sound at different portions of the sounding tube, reflected by side branch.

The subject invention can be best illustrated with the help of accompanying drawings.

DETAILED DESCRIPTION OF THE INVENTION

Figure 1:
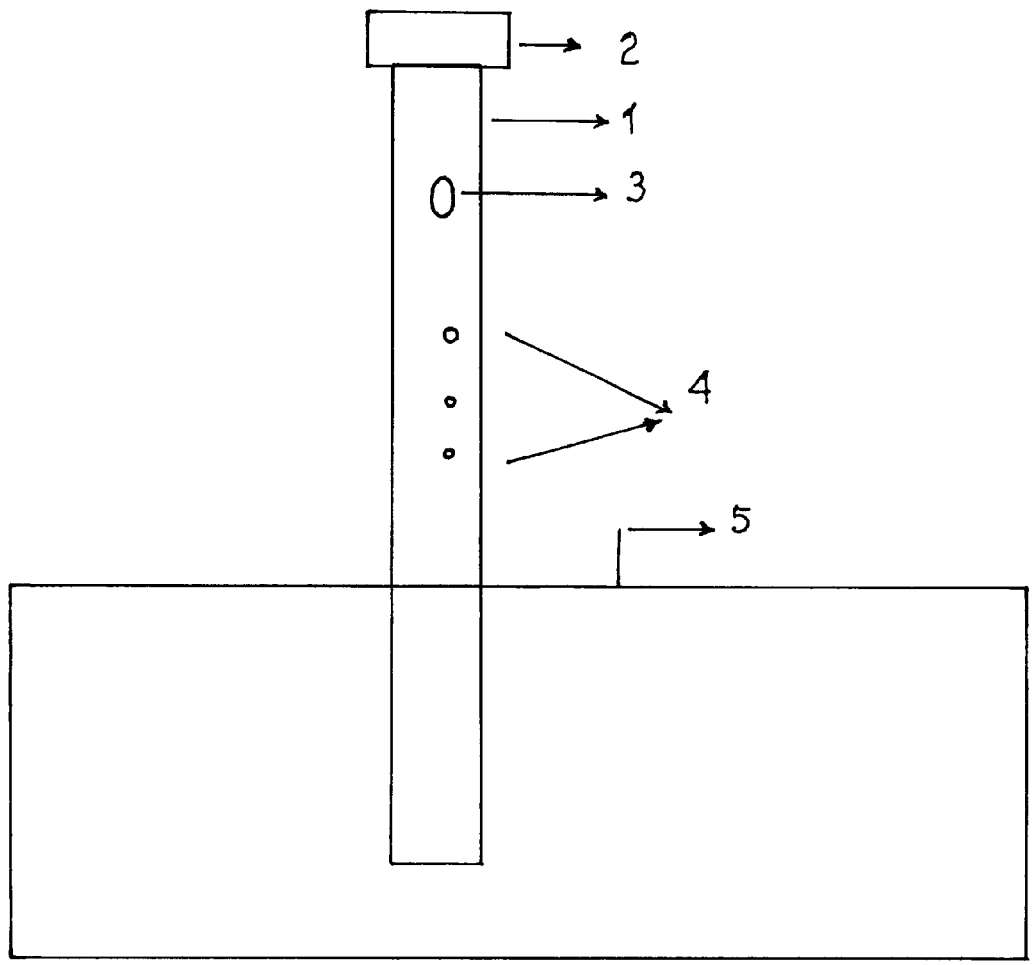
FIG. 1 depicts the conventional tide acoustic gauge showing the temperature sensors and the side wall calibration hole.

FIG. 1 depicts the calibration techniques used conventionally, where there is a guide tube (1), on one end whereof is a transducer (2) and the other end is submerged in water (5). On the guide tube there is provided a calibration hole (3) and the temperature sensors (4) for measuring the fluctuations in temperature.

Figure 4:
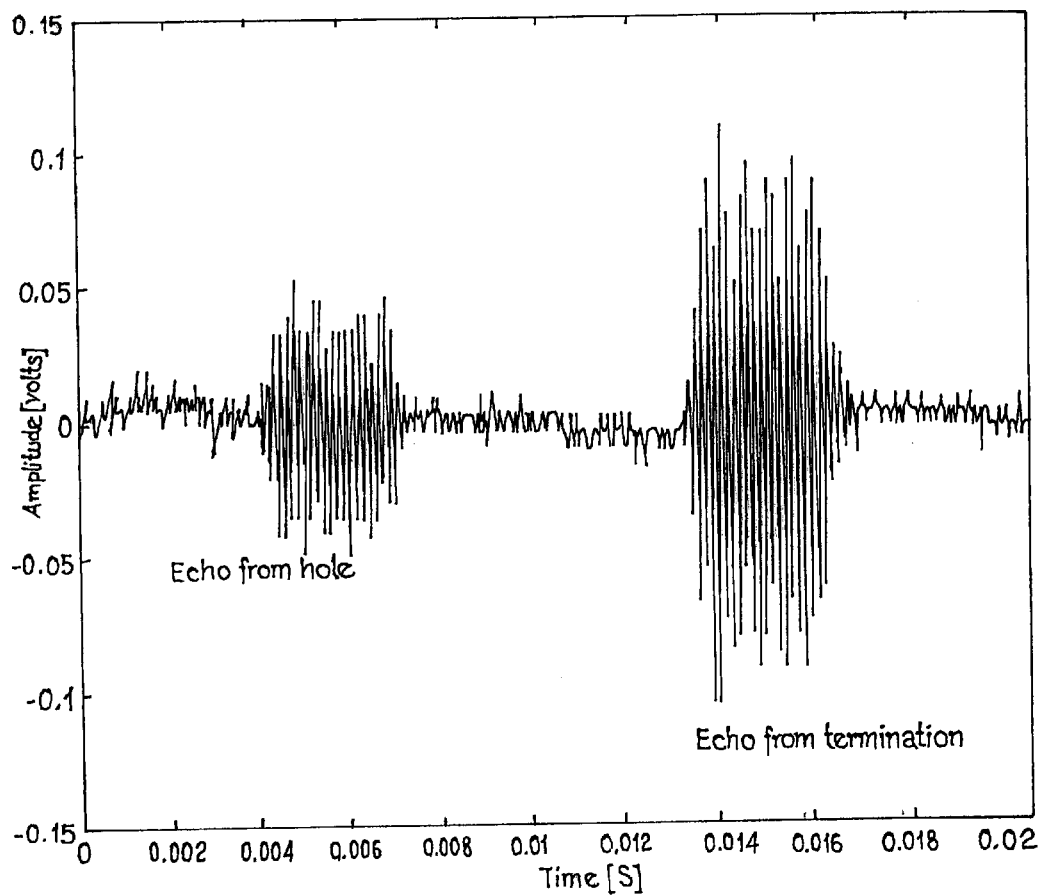
FIG. 4 depicts the received signal at the transducer for a sounding tube with a hole as calibrator.

The actual measurements of the received echo at the transducer using the hole as a calibrator has been shown in FIG. 4, identifying the two distinct echoes, first is the reflection from the hole and the second one is from the termination of the tube, representing the water-air interface. It is noted that the hole does not have resonant properties and hence the responses do not vary appreciably over the range of frequencies commonly used in acoustic tide gauge.

Figure 2:
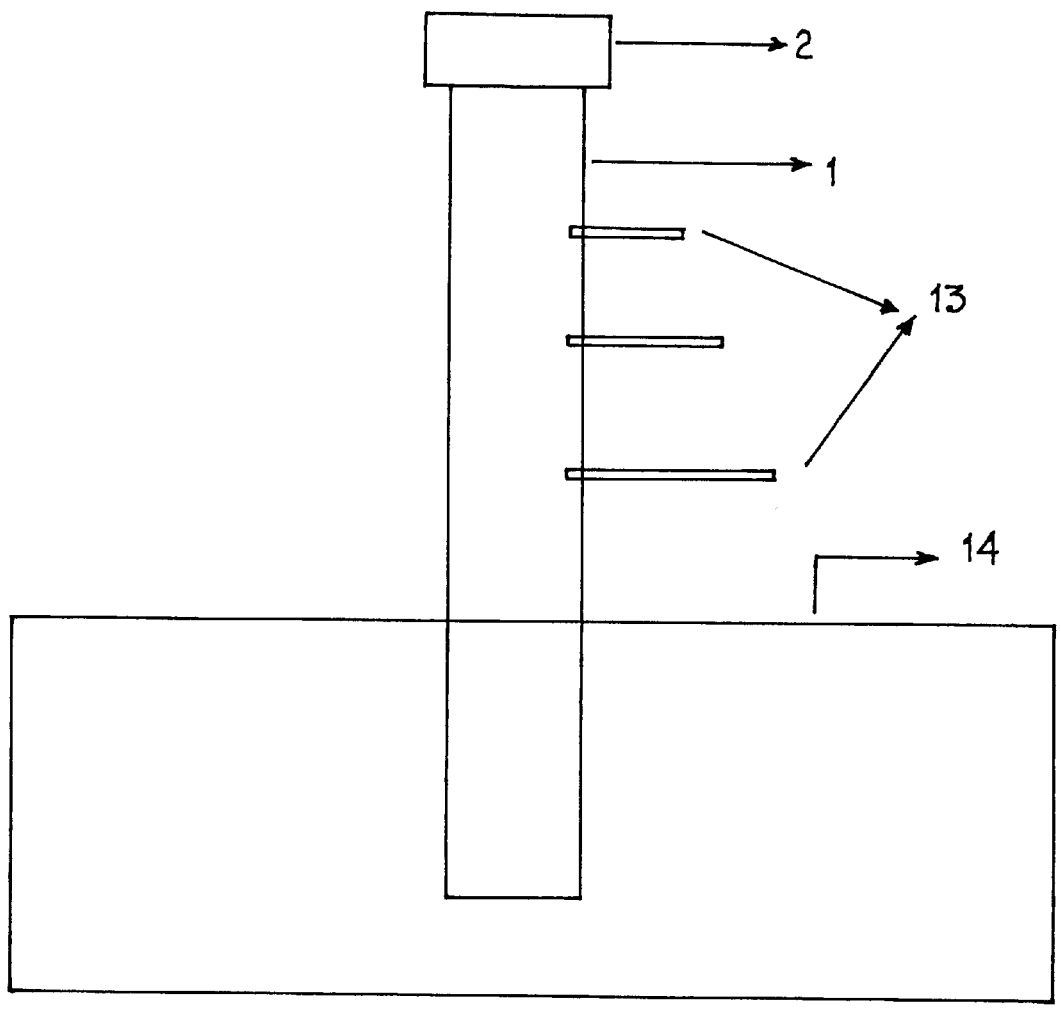
FIG. 2 depicts the calibration techniques for acoustic tide gauge as done in the subject invention.

The calibration technique as used in the subject invention as shown in FIG. 2, comprises a guide tube (1), wherein one end of the guide tube (1) is submerged in liquid/water (14) and on the other upper end of it is provided a transducer (2), the guide tube (1) having at least one branch tube (13) provided laterally along the guide tube (1).

In an another embodiment of the invention, the subject measuring device has two or more laterally oriented branched tubes (13) as shown in FIG. 2. As shown in FIG. 2, the side branch, which is at least one, may optionally be 2 or more, where each such branch is so designed to respond to a specific frequency such that the sound pulse with appropriate center frequency is predominantly reflected by the branch, enabling the effective velocity of the sound to be measured at different portions of the sounding tube. These pulses are termed calibration pulses. The center frequency of actual interrogation pulse, that is, the pulse that gets reflected from the water surface, is maintained such that all of the side branches have transmission maxima at that frequency.

Figure 3:
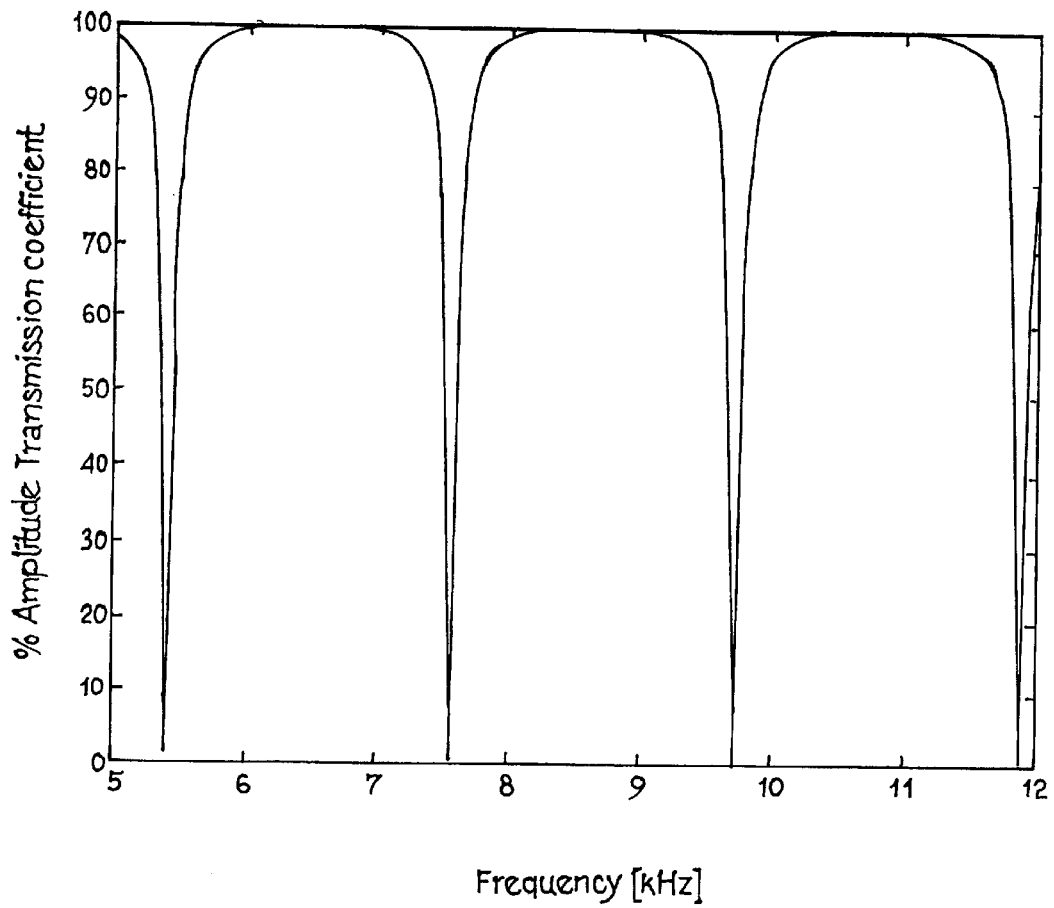
FIG. 3 depicts the variation of amplitude transmission coefficient of a resonating branch tube of length n=4 and f=7.6 kHz.

In the subject application, the in-situ calibration is achieved by closed side branch or branches connected laterally to the guide tube. The reflection of the side branch tube towards the sensor goes through a series of alternating maxima and minima as the center frequency of the sound pulse varies as shown in FIG. 3. The reflection maxima occur when the effective length of the side branch is an odd multiple of the quarter wave length for a given frequency of sound. Preferably, the length is fixed as 7.85 cm, which is 7 times that of the quarterwave length.

The sound pulse is completely reflected back by the side tube. The diameter of the side branch also plays a critical part, which is a fraction of the wave length of the sound wave for the given frequency. The diameter of the side branch is such to fix the side branch to the sounding tube.

To gain higher accuracy, the plane wave propagation condition inside the tube must be achieved, which is derived by the relationship between the wavelength and the diameter of the guide tube, which is obtained by the formulas $$d < \alpha_{10} \lambda$$

or $$d < 0.586 \lambda$$

(where $\alpha_{10}=0.586$)

where $\lambda$ is the wavelength of sound used, d is the diameter of the tube used for guiding acoustic pulse from the transducer towards the water surface and the back and $\alpha_0$ is a solution of the equation $$\frac{d\, J_1\, (\pi \alpha)}{d\, \alpha} = 0$$

where $J_1$ is the first order Bessel function.

Figure 5:
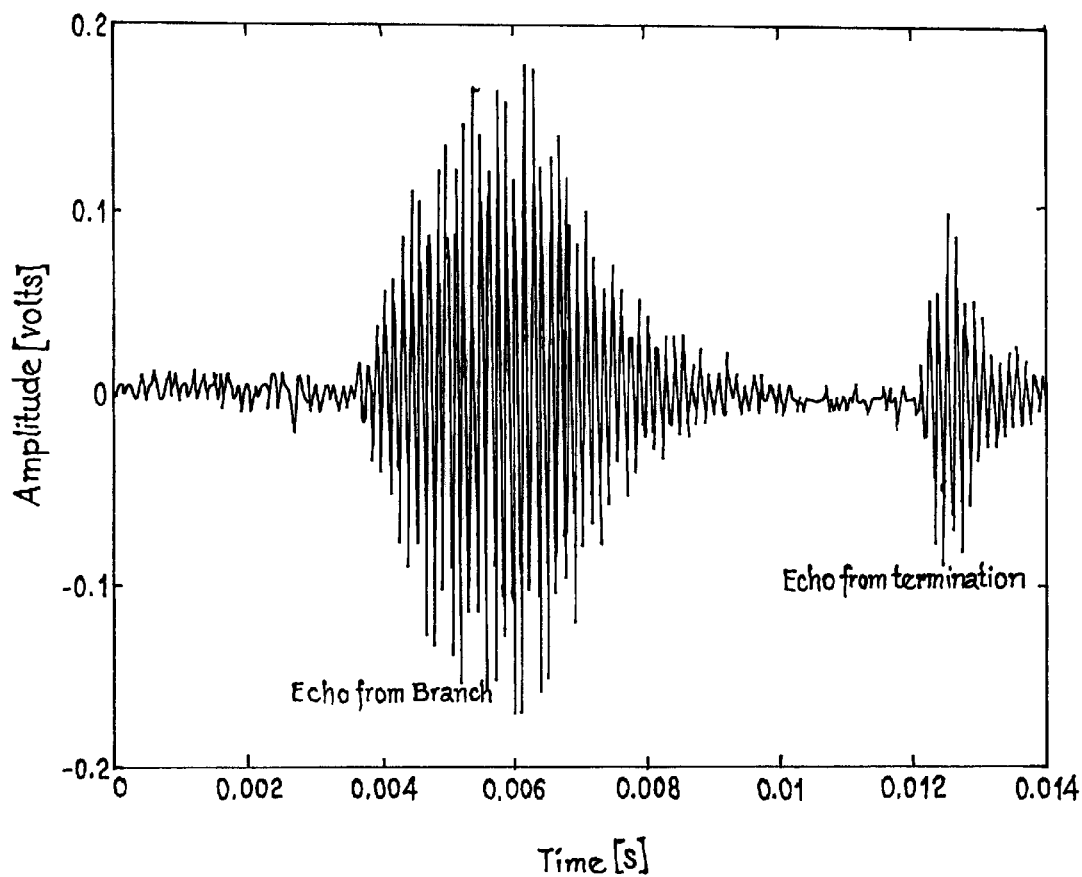
FIG. 5 depicts the received signal at the transducer for a sounding tube with side branch resonator as calibrator for f=7.6 kHz
Figure 6:
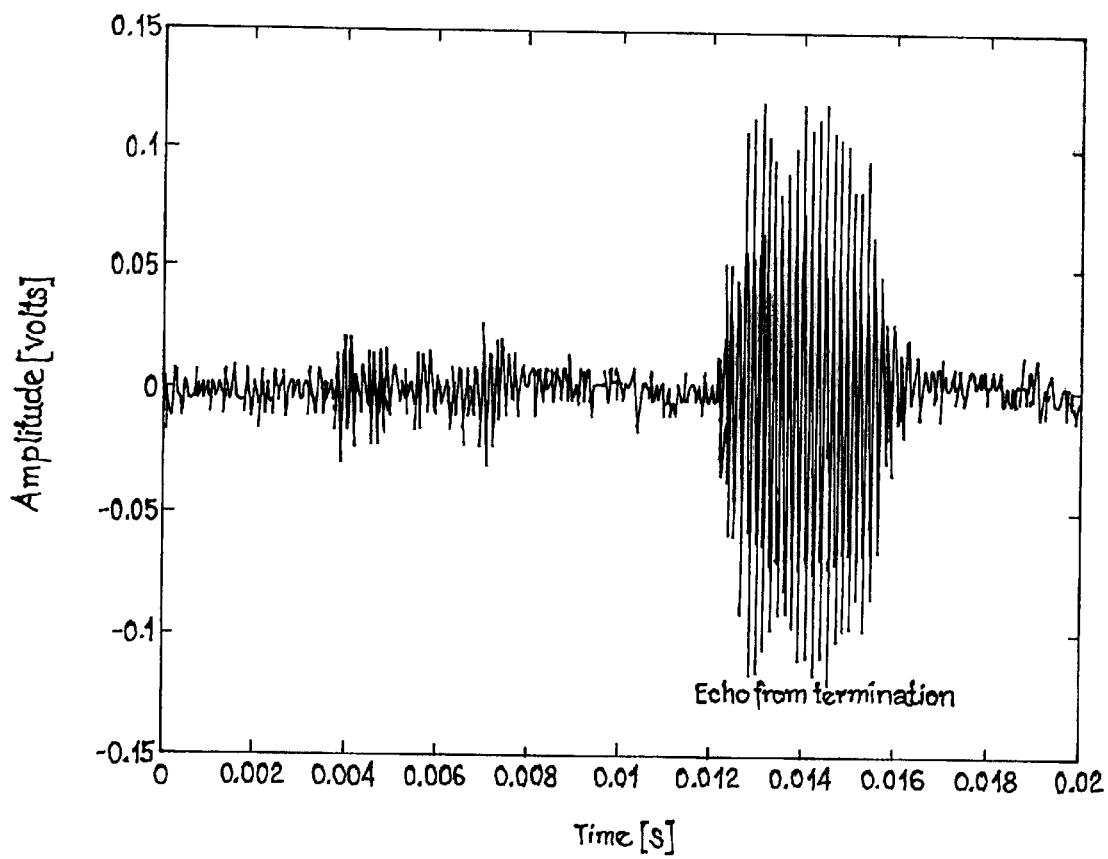
FIG. 6 depicts the received signal at the transducer for a sounding tube with side branch resonator as calibrator for f=6.4 kHz.

FIGS. 5 and 6 depict the measurement of the echo at the transducer using a resonating side branch attached to the guide tube. FIG. 5 clearly shows the received echo measured at the transducer for a gated sine wave with frequency 7.6 kHz. A strong reflection from the side branch, in addition to the echo from the termination is clearly visible. This represents the calibration pulse as explained above.

Figure 7:
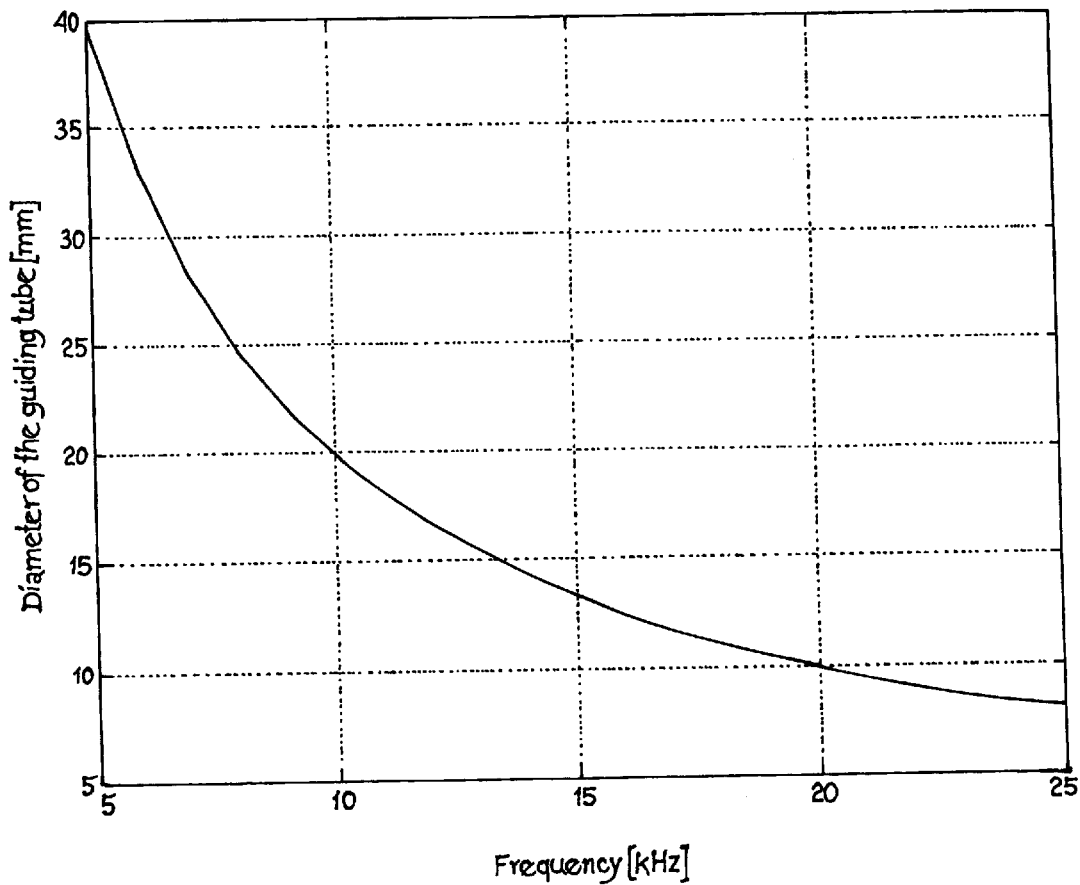
FIG. 7 depicts the diameter of the guide tube as a function of the maximum frequency of the sound pulse for realizing plane wave propagation in the guide tube.

The relation between the diameter of the tube and the frequency as shown in FIG. 7, where the diameter of the guide tube as a function of the maximum frequency of the sound pulse for realizing plane wave propagation in the guide tube has been shown. The measurements are done for the center frequency of 6.4 kHz using the same guide tube as above mentioned. The echo from the side branch tube is almost indistinguishable from the background noise. That is, the signal does not suffer significant reflection at the side branch. This represents the interrogation pulse as explained above.

Figure 8:
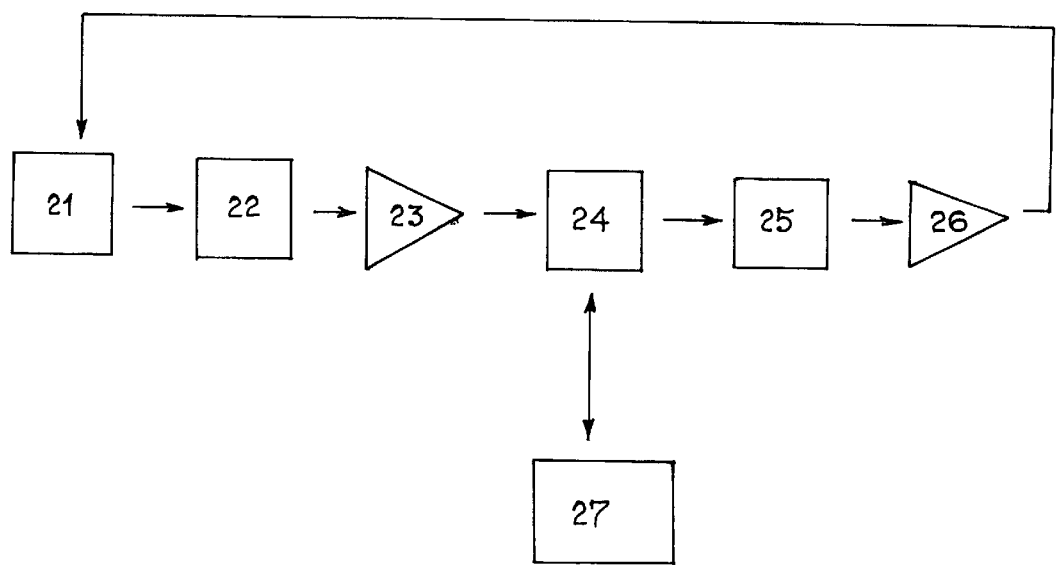
FIG. 8 depicts the block diagram of the measuring device

As shown in FIG. 8, the acoustic tide gauge comprises an electronic circuit for generation, processing and displaying of the data, a sensor head consisting of a suitable transducer to convert electrical energy to acoustical energy and vice versa and a mechanical system comprising a guide tube, means for calibration, stilling well and fixtures to erect the system at the site.

In the transmitting circuit, a sinusoidal signal of suitable pulse width and frequency is generated by a digital to analog IC, where a low pass filter is used to avoid aliasing. The signal is amplified to a suitable level by using a power amplifier (23) and supplied to the transducer (27). In the receiving circuitry, the received signal is suitably amplified using circuits developed by using operational amplifiers (26). The noise is eliminated by using analog filters.

The transducer (27) is used for generating and receiving the acoustic signals. While transmitting, the transducer is excited with high voltage and while receiving at the transducer terminal low voltage is generated. The transmitting and receiving stages are isolated by means of suitably biased diodes.

The sensor head is used to convert electrical signal to the acoustical signal and vice versa, which is achieved by using at least two separate units one each for electrical energy to acoustical energy conversion and acoustical energy to electrical energy conversion or one transreceiver unit.

The mechanical sub-system consists of the sensor head at the top, a guide tube and a stilling well. The sensor head is so attached as to achieve the propagation of acoustic pulse in the air through the inside of the guiding tube. Stilling well is used as a mechanical protection against the impact and also to minimize the effect of current and waves on the water level inside the guiding tube. The entire assembly has provisions for fixing the gauge to a suitable structure for field measurements of the tide level.

The guiding tube and the stilling well are made up of suitable engineering material.

The lower end of the tube is immersed at least 0.5 m below the lowest low water level, to minimize the undesirable effects of the currents and surface waves.

The apparatus of subject application is advantageous over the conventional ones, as a true in-situ calibration for entire length of the sounding tube is possible, which is achieved by the side branches.

Further, no additional hardware is required as done conventionally in the case of temperature sensors. In the absence of any moving parts, the fabrication and maintenance of the subject apparatus is easy. Moreover, in the absence of any loss of signal energy to the surrounding or significant reflection at the junction, the signal to noise ratio is improved leading to the improvement in the accuracy of measurement.

Although the present invention has been described with reference to the preferred embodiments, workers skilled in the art will recognize that changes may be made in form and detail without departing from the spirit and scope of the invention and the description should not in any way construed to restrict the scope of the invention for example using the subject measuring device in the reservoirs, tanks or closed vessels.

We claim:

1. A device for measuring tide level in sea comprising:

a guide tube having its lower open end immersed at least 0.5 m below the lowest tide level to minimize the undesirable effects of the current and surface waves, means for generating, processing and displaying the data signals, a transducer or a pair of transducers fixed substantially at the upper end of the guide tube for generation and reception of electrical as well as acoustical pulses, a switching circuit for isolating the transmitting and receiving signals, wherein at least one branch tube is provided near the upper end of the guide tube having its length determined by the formula $$L=(2n-1)\lambda/4=(2n-1)\,C/4f$$

where
    n=1,2,3 ... $\lambda$ is the wavelength of sound (meters);
    C is the velocity of sound (meters per second);
    f is the frequency of sound in Hz; and,
    the diameter of the guide tube is determined by the formula $$d<\alpha_{10}\lambda$$

or $$d<0.586\lambda$$

(where $\alpha_{10}$=0.586)
    where $\lambda$ is the wavelength of sound used, d is the diameter of the tube used for guiding acoustic pulse from the transducer towards the water surface and back.

2. A device as claimed in claim 1, wherein the said switching circuit isolating the transmitting and receiving signals are suitably biased diodes.

3. A measuring device as claimed in claim 1, wherein the said guide tube is made up of suitable engineering material.

4. A process for acoustically measuring liquid level preferably measuring tide level in sea comprising;

immersing the lower open end of the guide tube at least 0.5 m below the lowest water level, to minimize the undesirable effects of the currents and surface waves;

generating the electrical signals of suitable pulse width and frequency by a digital to analog converter and supplying the amplified signals to the transducer amplified by a power amplifier;

converting said electrical signal to the acoustical signal and vice versa by at least two separate units one each for electrical energy to acoustical energy conversion and acoustical energy to electrical energy conversion or one unit as transreceiver; and propagating the acoustic pulses in the air through the inside of the said guiding tube by transducer;

measuring the effective velocity of the sound at different portions of the sounding tube, reflected by side branch.

* * * * *